(12) United States Patent
Fang (10) Patent No.: US 8,150,928 B2
(45) Date of Patent: Apr. 3, 2012

(54) SPAM RESISTANT E-MAIL SYSTEM

(76) Inventor: Chin Fang, Mountain View, CA (US)

( * ) Notice: Subject to any disclaimer, the term of this patent is extended or adjusted under 35 U.S.C. 154(b) by 813 days.

(21) Appl. No.: 11/771,211

(22) Filed: Jun. 29, 2007

(65) Prior Publication Data

US 2008/0244021 A1     Oct. 2, 2008

Related U.S. Application Data

(60) Provisional application No. 60/921,635, filed on Apr. 2, 2007, provisional application No. 60/921,636, filed on Apr. 2, 2007, provisional application No. 60/921,637, filed on Apr. 2, 2007.

(51) Int. Cl.
*G06F 15/16*     (2006.01)
(52) U.S. Cl. ........................................ 709/206
(58) Field of Classification Search .................... 706/206
See application file for complete search history.

(56) References Cited

U.S. PATENT DOCUMENTS

| | | | |
|---|---|---|---|
| 2003/0191969 A1* | 10/2003 | Katsikas | 713/201 |
| 2005/0015455 A1* | 1/2005 | Liu | 709/207 |
| 2005/0216587 A1* | 9/2005 | John | 709/225 |
| 2005/0246420 A1* | 11/2005 | Little, II | 709/204 |
| 2006/0129644 A1* | 6/2006 | Owen et al. | 709/206 |
| 2006/0179113 A1* | 8/2006 | Buckingham et al. | 709/206 |
| 2006/0248573 A1* | 11/2006 | Pannu et al. | 726/1 |
| 2007/0250516 A1* | 10/2007 | Dahlberg et al. | 707/10 |

* cited by examiner

*Primary Examiner* — Wing Chan
*Assistant Examiner* — David X Yi
(74) *Attorney, Agent, or Firm* — Boyle Fredrickson, S.C.

(57) ABSTRACT

A spam resistant e-mail system employs communication via authenticated communication channels while providing a mechanism for rapidly growing a list of authenticated individuals and managing that list on a personal and collaborative basis to prevent spammers from joining the network.

22 Claims, 4 Drawing Sheets

SPAM RESISTANT E-MAIL SYSTEM

CROSS-REFERENCE TO RELATED APPLICATIONS

This application claims the benefit of provisional applications 60/921,635; 60/921,636; and 60/921,637, all filed Apr. 2, 2007, and hereby incorporated by reference.

STATEMENT REGARDING FEDERALLY SPONSORED RESEARCH OR DEVELOPMENT

Background of the Invention

E-mail or "electronic mail" is a computerized system for transmitting text messages and data files between identified individuals using the Internet. Most current e-mail systems use Simple Mail Transfer Protocol (SMTP), a default standard of the decentralized Internet community.

E-mail offers considerable advantages over competing communication technologies such as telephone calls or facsimile transmissions. In contrast to telephone calls, e-mail does not require the availability of both parties at the same time and provides a text record that can be stored or forwarded. The equipment required for e-mail is more readily available and more flexible than that required for facsimile transmissions. The transmission of e-mail costs less and normally requires less human involvement than the transmission of a facsimile.

While e-mail messages are reasonably secure and quickly transmitted from party to party, e-mail is plagued by bulk-transmitted, unwanted e-mail messages, known as "spam". The Messaging Anti-Abuse Working Group (MAAWG), a consortium of Internet providers, estimates that in 2007, 85% of incoming e-mail is spam, with over 90 billion spam messages being sent a day.

Currently, the problem of spam is managed principally through the use of filters at the e-mail recipient. These filters attempt to detect IP addresses or words commonly found in spam or use a blacklist identifying addresses transmitting spam. This former approach is error prone, while the blacklist is hampered by a sender's ability, under SMTP, to disguise his or her address ("spoofing").

This shortcoming of SMTP has led to the development of authentication systems for the SMTP protocol, for example, SMTP-AUTH or POP-before-SMTP. Generally such authentication systems have not been universally adopted, both because they require cooperation among many diverse parties and because the authentication process significantly limits an individual's freedom to communicate with any other individuals.

Some estimate that spam currently costs businesses over $170 billion per year in lost productivity. Sophisticated spam filters and blacklisting systems can cost individuals $200 per year or more.

BRIEF SUMMARY OF THE INVENTION

The present invention provides a spam resistant e-mail system that uses an authenticating Internet protocol and that allows rapid expansion and simple management of a list of authenticated users through the concept of personal "trusted human chains". Each user manages a trusted human chain of other users with whom they may communicate and rapidly grows this chain by incorporating the trusted human chains of other individuals with whom communication is established. In this way the universe of potential correspondents grows extremely rapidly. A set of tools allows each individual to manage his or her human chain based on his or her own and the collective knowledge of the group of users. A successful, decentralized, dynamic list of non-spamming individuals is thereby created. The ability to easily curtail the efforts of spammers significantly limits the incentive to send spam, further limiting spam.

One embodiment of the invention provides two additional, important features. The first is the use of standard SMTP e-mail addresses to identify individuals in the trusted human chain. This allows an almost seamless migration to the present system from standard e-mail. The second is the use of a pre-existing Internet standard having intrinsic authentication (intended for instant messaging) thereby eliminating a need to obtain wide scale adoption of a new Internet protocol. Specifically then, the present invention provides a spam resistant e-mail system having at least one e-mail managing computer connected to the Internet to communicate with users on user computers via an authenticated communication protocol. The e-mail managing computer and user computers execute stored programs to establish authenticated communications between the users and the e-mail managing computer and to allow each given user to form a given trusted human chain listing other member users. This given trusted human chain is recursively augmented to include other users linked to member users by trusted human chains of the member users. The system allows source-identified communication of e-mail messages between the given user and one or more specified users in the given user's augmented trusted human chain.

It is thus a feature of one embodiment of the invention to provide for an authenticated e-mail system that rapidly expands to allow communication among a large number of individuals. Potentially, each individual trusted human chain quickly converges to all non-spamming individuals on the Internet, taking advantage of so called "small world phenomenon" postulating a linking of all connected individuals by a small number of links averaging about six.

Each user in the augmented trusted human chain may be identified by an e-mail address of a SMTP e-mail system.

It is thus another feature of one embodiment of the invention to allow easy migration from current e-mail systems (and current e-mail addresses) to the spam resistant e-mail system of the present invention and to allow their co-existence for an indefinite period of time.

The system may communicate invitation messages using unauthenticated e-mail communications between the given users and potential users who have not established authenticated communications with the e-mail managing computer. These invitation messages allow the potential users to establish authenticated communications with the e-mail managing computer and to be added to the given user's augmented trusted human chain.

It is thus another feature of one embodiment of the invention to use a highly scalable process, analogous to that of building the trusted human chains, to convert individuals to the spam resistant e-mail system.

The system allows the given user to delete users from the augmented trusted human chain.

It is thus a feature of one embodiment of the invention to enlist the individuals in the system as managers of spam sources and thus to create a decentralized and scalable system for identifying and removing spammers.

The given user may identify a user to be deleted by selecting a message communicated to the user.

It is thus a feature of one embodiment of the invention to provide a system for managing the trusted human chain that is as simple as identifying and deleting spam messages themselves.

For each user in a trusted human chain, the e-mail system may store a join date of the user and the last date of communication by the user using the spam resistant e-mail system. This data is usable by the given user to manage the given user's augmented trusted human chain.

It is thus a feature of one embodiment of the invention to provide the users with temporal data about the individuals in the trusted human chain and thereby to provide sophisticated management at the individual level either by manual action or rules effected by the individual.

In addition or alternatively, the system may record a hierarchy of the users in the trusted human chains and statistics of deletions of users. Again this data may be available to the user in managing his or her trusted human chain.

It is thus a feature of one embodiment of the invention to allow individuals to manage their trusted human chains taking advantage of the collective wisdom of the group and the relationships among members of the trusted human chain.

In addition or alternatively, the system may record data describing a tree joining the users and may calculate a distance along this tree between any two users.

Thus it is a feature of one embodiment of the invention to allow an individual user to manage his or her trusted human chain by controlling the number of degrees of separation defining his or her own chain or new chains added to his or her chain.

The authenticated communications between the users and the e-mail managing computer may use an instant messaging protocol.

It is thus a feature of one embodiment of the invention to make use of currently available authentication standards.

The instant messaging protocol may be XMPP.

It is thus another feature of one embodiment of the invention to make use of an approved Internet standard (IETF standard).

When the system communicates an e-mail message between an originating user and one or more receiving users in the given user's augmented trusted human chain, the system may provide a link to an attachment to the e-mail message invocable by the receiving users to transfer attachment data from a stored file for the originating user to a stored file for the receiving users. This transfer may not occur until invocation of the link by the receiving user.

It is thus a feature of one embodiment of the invention to eliminate the transfer of attachments for unwanted messages thus significantly decreasing Internet traffic.

These particular features and advantages may apply to only some embodiments falling within the claims and thus do not define the scope of the invention.

DETAILED DESCRIPTION OF THE INVENTION

Figure 1:
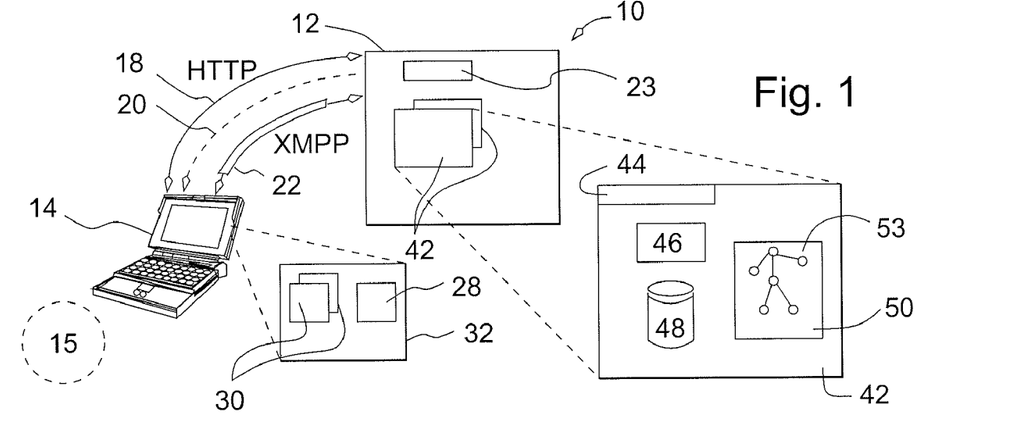
FIG. 1 is a diagram showing communication between a user and an e-mail server of the present invention during authentication of the user.

Referring now to FIG. 1, the present invention provides a spam resistant network 10 including one or more e-mail managing computers 12, typically servers, that may communicate with user-computers 14 operated by users 15. The e-mail managing computers 12 and user-computers 14 are programmed to implement, between them, the protocols of the present invention.

In this regard, the e-mail managing computer 12 will preferably provide for a number of Internet communication channels with the user-computer 14 including for example: a Web channel 18 allowing the exchange of HTTP protocol data, a file transfer channel 20 which may for example be the Web channel 18 or a channel using another protocol such as FTP, and an authenticated channel 22.

In the preferred embodiment the authenticated channel 22 uses the XMPP protocol (www.xmpp.org), an IETF standard instant messaging protocol that allows for authentication of text messages. More generally, because the authenticated channel 22 may be implemented readily between the e-mail managing computers 12 and the user-computers 14, wide scale adoption of an IETF standard authentication protocol is not required and proprietary authentication systems could be used.

In addition, although not explicitly indicated in the relevant figures, a data encryption layer, such as the Secure Socket Layer (SSL), can be readily added to all said communication channels to further improve the security and privacy levels of said channels.

Figure 2:
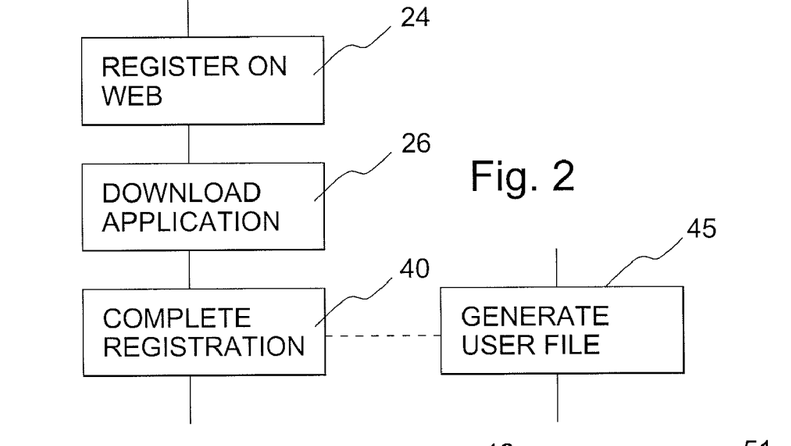
FIG. 2 is a flow chart of the authentication process of FIG. 1.

Referring also to FIG. 2, at a first step of the protocol of the present invention, the user 15 on user-computer 14 undertakes a first part of a registration process with the e-mail managing computer 12 through a website program 23 contained on the e-mail managing computer 12. The user 15, at this time, may contact the website program 23 using a standard browser on the user-computer 14 via the Web channel 18. This website program 23 takes some identifying information about the user 15 and the user-computer 14 and may have the user 15 execute a legal agreement with respect to use of the spam resistant network 10 as indicated by process block 24.

At succeeding process block 26, the user-computer 14 downloads an application program 28, for example by file transfer channel 20. This downloaded application program 28 is held in the user-computer 14 along with other programs 30 used by the user 15 including for example, the web browser and a standard SMTP e-mail system, and works together with the website program 23 to implement the steps of the present invention.

Referring still to FIGS. 1 and 2, at succeeding process block 40 the registration process is completed by establishing additional data necessary to authenticate the user-computer 14 including a standard SMTP e-mail address and possibly including other authenticating information such as a unique Internet address or a serial number from a network interface card on the user-computer 14. A time delay and/or a CAPTCHA or the like may be used to prevent automated registrations. This authentication may also assign to the user 15 a unique password or PIN number. The authentication process may allow the users to employ one or several computers using their pin numbers to establish their identity or by registering each particular computer individually. Preferably the authenticating information for each user 15 includes the standard SMTP e-mail address of the user 15, a password selected by the user 15, an optional screen name, and optionally other identifying data, for example, biometric data. Together this data provides a unique identification of the individual. The availability of such identity information enables users of the system to identify each other with a high degree of confidence, so as to mitigate or avoid the typical problems with phishing, pretexting and other forms of "social engineering" that are plaguing the current online communications.

At this point the authentication process is complete and an authenticated channel 22 has been established for communication between the e-mail managing computer 12 and the user-computer 14. The authenticated channel 22 operates to ensure that the user 15 (or the user-computer) is accurately identified in any communication between the user-computer 14 and the e-mail managing computer 12. At any time after authentication, the user may log into the website program 23, and after correctly identifying himself or herself, may edit or change this authentication information, as will be described further below.

Referring to FIG. 1, the data from this authentication process is stored in a unique user file 42 generated by the server per process block 45. Each user file 42 includes an identifier 44 of the user 15, which in the preferred embodiment is a standard SMTP e-mail address of the user. The user file 42 also includes an e-mail buffer 46, and attachment storage 48, and a trusted human chain file 50 for that user 15 as will be described.

Figure 3:
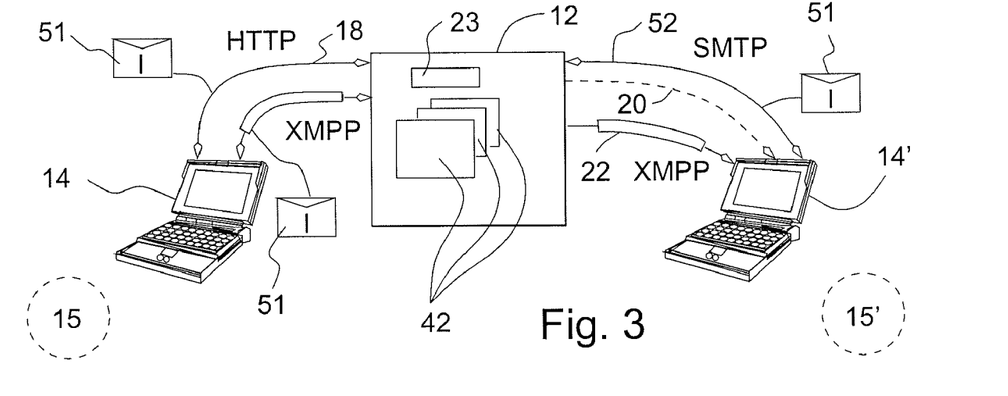
FIG. 3 is a diagram similar to that of FIG. 1 showing the process of inviting a second user into a trusted human chain of the first user to form an initial trusted human chain.

Referring now to FIG. 3, initially the user 15 of the user-computer 14 will not be able to communicate with other users 15' using the spam resistant network 10 which allows communication only with other authenticated users 15'. Each such authenticated user 15' will be held in a list of such users 15' within the trusted human chain file 50, which is initially empty, or more accurately, is a trusted human chain consisting only of the user 15.

Figure 4:
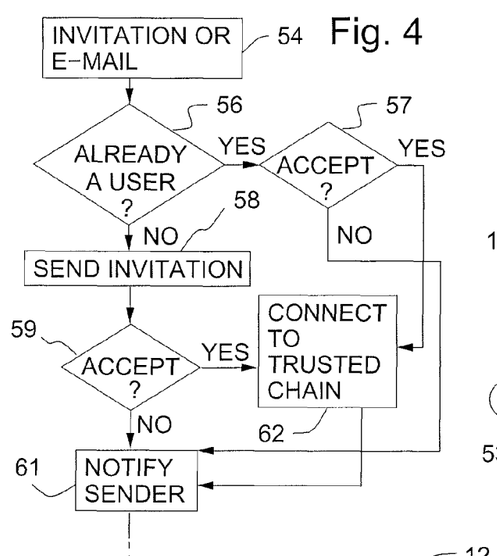
FIG. 4 is a flow chart showing the steps of the process of FIG. 3.

The user 15 must therefore populate the trusted human chain file 50, that is, create an initial trusted human chain 53 of individuals who have been authenticated in the process described above with respect to process blocks 24, 26, 40 and 45 and are listed in the trusted human chain file 50. Referring to FIGS. 3 and 4, for this purpose, the present invention allows the users 15 to send out invitation messages 51, per process block 54, by providing user SMTP e-mail addresses for other users 15' over the Web channel 18 to the website program 23 or preferably by use of the authenticated channel 22.

At process block 56, the e-mail managing computer 12 checks through all trusted human chains 53 in all user files 42 on its system to determine whether the invited user 15' is already authenticated with the e-mail managing computer 12, and thus on a trusted human chain of at least one user. If the result is affirmative, the e-mail managing computer 12 relays the invitation to the invited user 15', who may react to the invitation per decision block 57. Upon acceptance the user 15' is added to the trusted human chain 53 of user 15 at process block 62 and the user 15 is immediately notified of this as indicated by process block 61 and may begin spam free communication with user 15'. Otherwise, the user 15' is not added to the trusted human chain 53 of user 15, and the user 15 is also notified at process block 61.

If at process block 56, the user 15' is not already in a trusted human chain 53 on the system, an invitation e-mail 51 is sent by the e-mail managing computer 12 (if the user is a "lone" user having no trusted human chain—typically because of a lapse in usage for an extended length of time), or a regular e-mail managing computer (if the user is not authenticated) that the user 15 has access to, using standard SMTP e-mail communication channels 52 as indicated by process block 58 to the user 15' inviting him or her to join the trusted human chain of user 15.

The invitation e-mail 51 is received by the user 15' via a standard e-mail program and may for example provide a link or URL to the website program 23 of the e-mail managing computer 12 with a text message inviting the user 15' to join the spam resistant network 10. The user 15', reading the e-mail, may react by authenticating as described above with respect to FIGS. 1 and 2 and as determined by decision block 59. If the user 15' declines or fails to joint the spam resistant network 10 after a predetermined period of time, the user 15 is notified per process block 61. Otherwise, the user 15' is added to the individual's trusted human chain (after authenticating themselves) as indicated by process block 62 and user 15 is notified at process block 61. Note that after this authentication process user 15' may also begin using the spam resistant network 10 for his or her own purposes.

Figure 5:
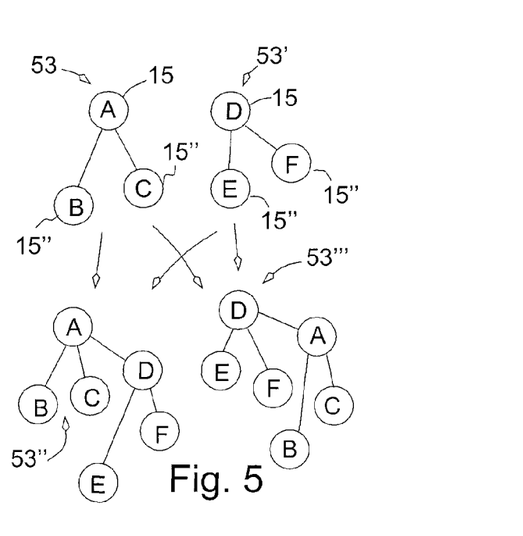
FIG. 5 is a set of tree diagrams depicting simple trusted human chains showing the aggregation process that occurs during the invitation process.

Referring now to FIG. 5, the adding of a user 15' to the trusted human chain 53 of user 15 will normally also add those users 15" on the trusted human chain 53 of the added user 15'. Thus, for example, the inviting user 15 may have a trusted human chain 53 including themselves (illustrated as node A) and two other individuals (illustrated as node B node C). The invited user 15' (node D) may have a trusted human chain 53' having two connected users 15" (nodes E and F). At process block 62, the connection of user 15 to a trusted human chain of user 15' may merge the trusted human chain 53 to the trusted human chain 53". The result is that trusted human chain 53 of user 15 becomes trusted human chain 53" having node A with branches nodes B, C, and D, with node D having branches to nodes E and F. Likewise the invited user 15' finds their trusted human chain 53 converted to a human chain 53''' having node D with branches to nodes E, F, and A, with node A having branches to nodes B and C. These trusted human chains 53" and 53''' will be termed augmented trusted human chains.

Figure 6:
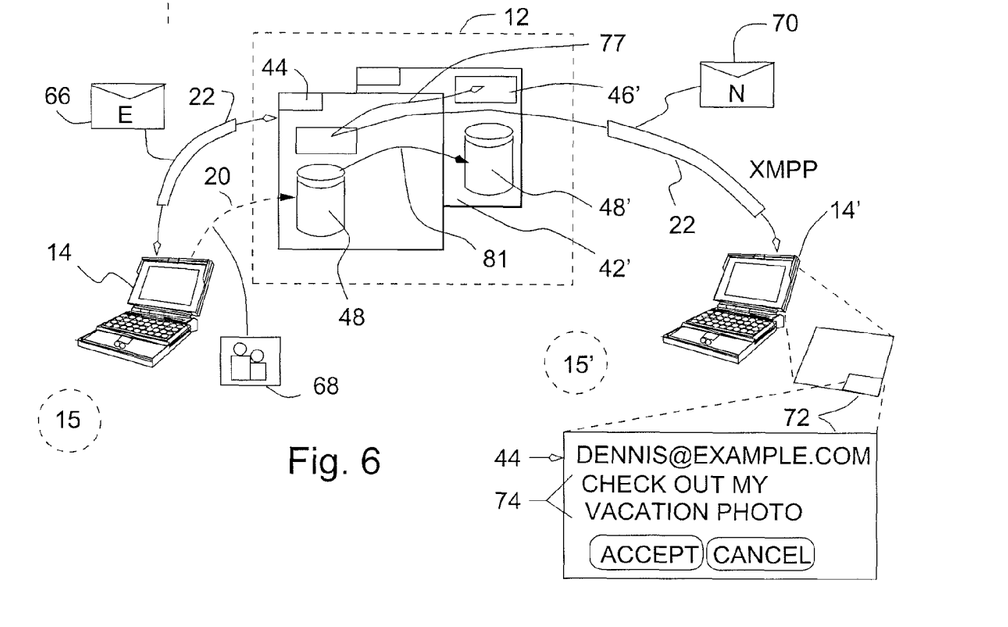
FIG. 6 is a diagram similar to that of FIG. 1 showing the communication of e-mail using the present invention between members of a trusted human chain.

Referring now to FIG. 6, once an augmented trusted human chain 53 is produced, spam resistant e-mail communications may be made between any of the members of the augmented trusted human chain 53. The e-mail message 66 may be sent using application program 28 by user 15 simply identifying a second user 15' of user-computer 14' by the standard SMTP address of that user. The method of generating and sending this e-mail message may appear identical to that provided by standard e-mail programs and may allow selection of a recipient through the use of a directory (displaying the contents of the user's trusted human chain 53) or by directly typing the address into the e-mail. The invocation of the spam resistant network 10 is automatic when the e-mail is composed using the application program 28 on the user-computer 14.

The e-mail message 66 using the spam resistant network 10 may include a text e-mail message 66 and possibly be associated with an attachment 68. The text portion of the e-mail message 66 is sent via the authenticated channel 22, thus assuring the recipient that the source of the e-mail (user 15) is accurately preserved and eliminating the possibility of spoofing. The attachment 68 may be sent by the channel 20 and is not directly authenticated but implicitly authenticated by association because it must be linked with (and accessed through) an authenticated e-mail message 66. In this way authenticated instant messaging protocols such as XMPP may be used for standard e-mail functionality despite not being intended for this purpose and not having the ability to include attachments. This dual channel of transmission is provided by the application program 28 which simply automatically opens the second channel according to techniques understood in the art.

The e-mail message 66 received by the e-mail managing computer 12 is placed in the e-mail buffer 46 of the user 15. At the same time, a notification message 70 containing a portion of the text of the e-mail message 66 is forwarded via the authenticated channel 22 to the user 15'. The attachment 68 is placed in the attachment storage 48 of the user file 42 of user 15 and not transmitted further for the time being. The data of the e-mail buffer 46 and the attachment storage 48 of the user 15 is subject to an access control by the user 15, meaning that the user 15 may establish permissions for access to this data. Normally the permissions will be set to allow access by the user 15'. The access control may allow the user 15 to, for example, grant both read and write accesses to attachments 68 to the user 15' (or deny either), a benefit and flexibility that is not available under ordinary e-mail.

Figure 7:
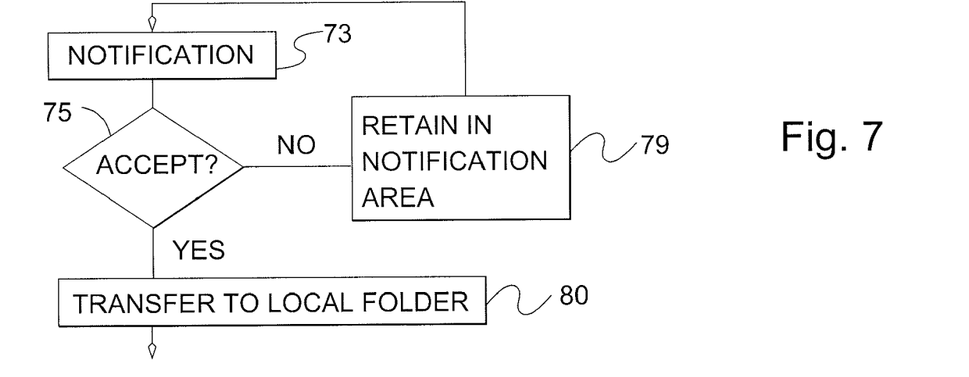
FIG. 7 is a flow chart showing the steps of FIG. 6.

As noted above, assuming that the destination user 15' is on the trusted human chain 53 of user 15, as indicated by process block 73 of FIG. 7, a notification message 70 is sent by authenticated channel 22 to user-computer 14'. At the recipient's user-computer 14', a notification box 72 appears on the screen (shown enlarged to the right of the screen of computer 14') providing the identifier 44 of the sending user 15 (which is reliable because it resulted from an authentication process) an excerpt or all of the short tests text message 74 contained in e-mail message 66. The notification box 72 also provides accept and cancel buttons at 76.

It should be noted that at this point in time very little information has in fact been transmitted over the Internet to the user 15', only enough to provide the notification box 72. In the case of e-mails sent to multiple users, this approach vastly decreases the amount of traffic actually forwarded.

At decision block 75, the user 15' may accept the e-mail message 66 by pressing the accept button, in which case, as indicated by process block 79 in FIG. 7 and transfer arrow 77 in FIG. 6, the full text of the e-mail message 66 is transferred to the e-mail buffer 46' of the user file 42' of the user 15'. At the same time as indicated by arrow 81 the attachment 68 is transferred to the attachment storage 48' of the user file 42' of user 15' as indicated by process block 80.

If, upon the notification box 72 appearing the user's screen, the user 15' presses the cancel button, the e-mail message 66 is refused and no further transmission to the user-computer 14' occurs. The user 15 may receive a notification message to this effect. If the user 15' does not reply to the notification block (for example because user-computer 14' is not online) the notification is retained in the notification area of user's e-mail buffer 46' and may be reviewed online by the user 15' at a later time. The e-mail managing computer may be programmed to periodically send notification messages 70 to the user 15' indicating that he or she has unread notifications.

Figures 8, 9:
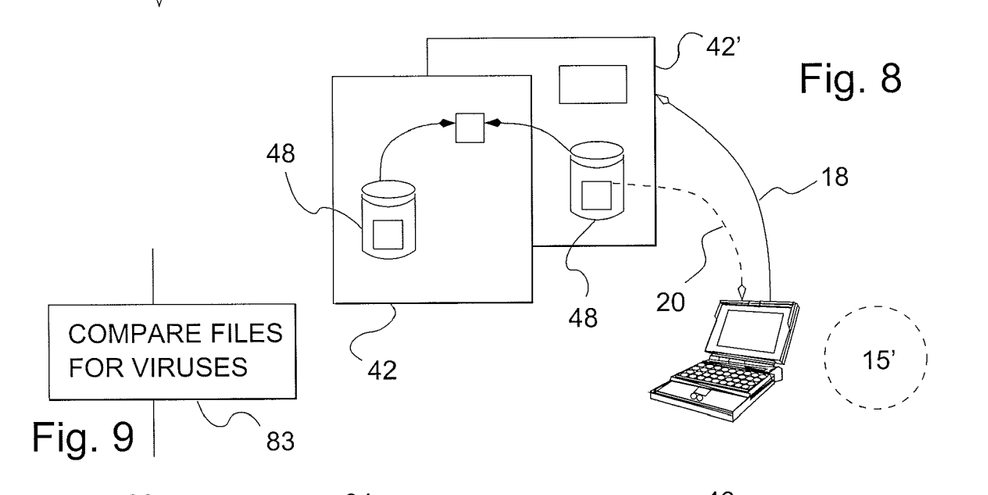
FIG. 8 is a diagram similar to that of FIG. 1 showing the transfer of an attachment to an e-mail message of the present invention.
FIG. 9 is a fragmentary flowchart showing a step of virus detection possible in the present invention by the server.

Referring to FIG. 8, the user may then periodically log into the user file 42' for example using the HTTP channel 18 or other file transfer channel 20 to read the e-mail messages 66 that have not been responded to and respond to them by sending a reply e-mail message 66 or the like. The underlying e-mail message 66 of the notification may be forwarded in a similar fashion to that provided by normal e-mail using the spam resistant network 10, and may be sent to a standard SMTP e-mail system by using a special option. At any time, the user 15' may download the attachment 68 from the attachment storage 48' using any secure protocol such as channel 20.

It will be understood that the present invention prevents the clogging of inboxes with unwanted attachments 68 even from accepted sources. Once the attachment 68 is accepted, however, the attachment exists in multiple copies in different user file 42. This storage burden may be reduced on a given e-mail managing computer 12 by simply providing pointers to common data files for the attachments 68. Alternatively multiple shadow copies of the files of the attachments 68 may be created and these multiple copies may be used as indicated by FIG. 9 for the detection of viruses or corruption of the files by an inter-file comparison process 83 comparing files on various user files 42.

This feature of sending an attachment 68 to user 15' by a transfer between user files 42 can significantly decrease Internet traffic in cases where users 15' are clustered locally. Thus, for example, a first user 15 communicating with multiple recipient users 15', the latter of which are clustered, may send the attachment 68 over the Internet only once and transfers to the multiple users 15' may occur solely within the e-mail managing computer 12 shared by each of the users 15', or with a localized peer to peer data transfer in which all participating peer computers 14' are (1) authenticated with an e-mail managing computer 12 that is accessible to such user computers 14', (2) are owned and operated by users 15' who are members of the same Trusted Human Chains, and (3) are allowed to participate in such P2P transfers with the permission of users 15'. Should such a P2P scheme be activated, more robust and quicker data transfers for all participating user computers 14', together with improved scalability of the e-mail managing computer 12, may occur.

It will also be understood that the present invention provides a solution to the problem of a user 15 inadvertently or inadvisably sending an e-mail or an attachment to user 15' that the user 15 may wish to retract or modify. As noted above, so long as the user 15' has not responded to a notification message, the bulk of the data of the e-mail remains in user file 42 of the user 15 where it is subject to access control by the user 15. Accordingly the user 15 may simply change the permission of this data to deny access e-mail even after it is sent (but before it is reviewed by the user 15') to effectively retract that e-mail and the attachments.

This retention of control of the data by the user 15 may be further exploited to allow modification of the e-mail message 66 and the attachment 68, invisibly to the user 15', to effect a correction of that data. This mechanism further allows an automatic notification to the user 15 as to whether the e-mail has been reviewed by the user 15', i.e. a "return receipt".

The present invention rapidly populates a human chain 53 for any user 15 and in fact with as few as six levels or degrees of separation a trusted human chain 53 can theoretically encompass a number of individuals approximating the number of non-spamming individuals on the Internet. This rapid scalability also creates the risk of incorporating spamming individuals, however, and therefore the user is provided with tools to manually or automatically manage their trusted human chains 53.

Figure 10:
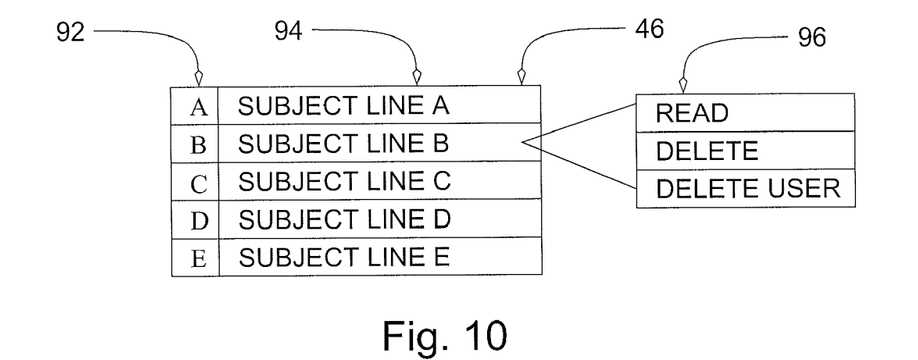
FIG. 10 is a screen display of an e-mail in-box provided by the present invention showing management of a trusted human chain by selection of a message.

Referring now to FIG. 10, at a most basic level each user 15 is given the ability to delete other users from their trusted human chain 53. In a preferred embodiment, this may be accomplished most easily when the user 15 is reviewing his or her e-mail buffer 46 which may as illustrated provide at least two columns: a first column 92 providing names of the sources of notifications (in the preferred embodiment being SMTP e-mail addresses) and the second column 94 providing subject lines or snippets of the text message. For each row, the user may invoke a submenu 96, for example, by right clicking on a mouse. The submenu 96 provides a set of menu choices including reading the e-mail message 66 (which like a standard e-mail system opens the e-mail and displays icons of the attachments), deleting the e-mail message 66 (which deletes the e-mail from the e-mail buffer 46, and deleting the user (which deletes the sender of the e-mail from the user's trusted human chain 53). In this way, if a spam sender should slip into the trusted human chain he or she may be simply removed.

Figure 11:
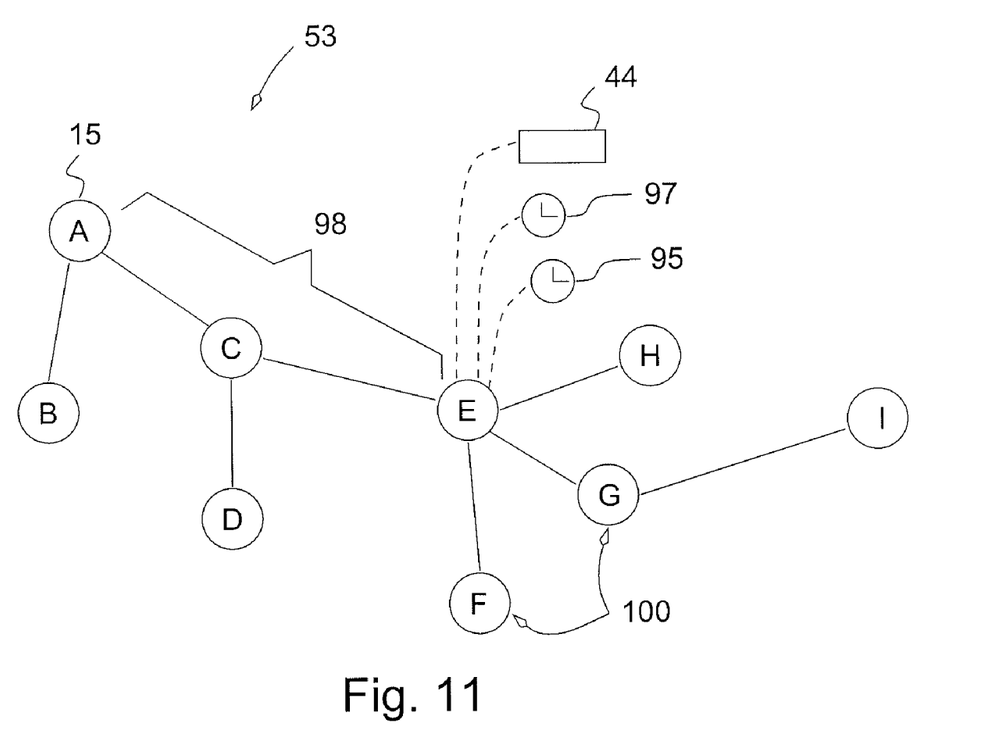
FIG. 11 is a tree-diagram similar to that of FIG. 5 showing an individual's augmented trusted human chain together with data recorded for the members of the chain such as may be used to manage the trusted human chain.
Figure 12:
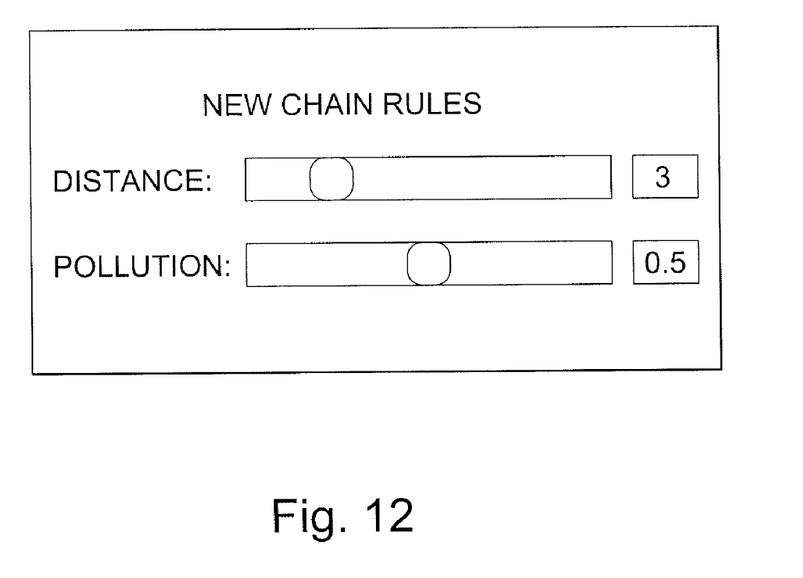
FIG. 12 is a simplified screen display of a user control that may be used to manage the individual's trusted human chain.

Importantly, the present invention also provides more sophisticated trusted human chain management tools that may be implemented manually by the user or through a set of user-invoked rules created by the user or previously prepared and accessible from a menu. Referring to FIG. 11, an example trusted human chain 53 includes eleven nodes labeled A-I. Each node of the trusted human chain 53 is linked to a database record holding the node's parent node such as is necessary to reconstruct the tree hierarchy shown in FIG. 11. Each node also contains the identifier 44 of the user represented by the node, the time 95 that the user joined the trusted human chain, and the time 97 of the user's last communication using the spam resistant network 10. A program implemented in the present invention also calculates additional data that may be useful in managing the trusted human chain 53 including a distance 98 between the top node (the user who owns the trusted human chain 53) and any other given node, and a "pollution index" calculated as the number of nodes 100 within the trusted human chain 53 that have been deleted by the given user owning the trusted human chain 53 or other users in other trusted human chains. Thus, for example, node E. connects to four nodes F, G, H, and I, two of which have been deleted by the user or other users (for example in other trusted chains). Thus, the pollution index for node E. is 0.5 indicating that half of the members in the chain having a root node of E have been deleted by some individual. Other pollution indexes may be created based on this principle.

Using this recorded data for the trusted human chain 53, the user 15 may create a set of rules governing how his or her trusted human chain 53 will grow. For example, using the time data the user 15 may eliminate individuals from his or her trusted human chain 53 who have not communicated on the spam resistant network 10 in over a year to weed out possibly abandoned addresses. The distance calculation may be used, for example, to limit the absolute size of the trusted human chain or when an aggregation of two trusted human chains 53 is being performed, to take only the top level or top few levels of the trusted human chains 53 of individuals invited into the user's network. The pollution index may be used to prevent aggregation with trusted human chains 53 that are highly polluted, excepting only the user 15' who is invited and not the trusted human chain 53 of the user 15'.

In this way the users 15 may absolutely manage their trusted human chains 53, may apply rules and techniques to limit the growth of their trusted human chains 53, and by using authenticated channel 22 may avoid problems of spoofing. The authentication process and the inability of spammers to operate successfully on the network will both limit existing spammers and the motivation of new spammers to join the spam resistant network 10. The system is readily adaptable to charging a small fee for the transmission of the e-mail, an approach that eliminates the principal benefit of spamming, that is having low per mailbox transmission cost.

As noted above, any user 15 may log onto the website program 23 after they have been authenticated, and change their authenticating information. For example, the user 15 may wish to change their SMTP e-mail address based on a change in e-mail provider. Such changes may be automatically communicated to all other individuals 15' in the user's trusted human chain 53 and in particular may automatically update the user's directory provided by the present invention (functionally equivalent to contact lists in standard SMTP e-mail). Because of the authentication process underlying the present invention, such an ability to edit the user's screen name or other authenticating particulars presents very little risk to the integrity of the trusted human chain 53. On the other hand it provides great flexibility for the user to change his or her conventional e-mail address or screen name, for example. The ability to automatically and safely correct other user's directories allows the present invention to be used to provide all users with up-to-date lists of conventional e-mail addresses for the individuals in their trusted human chains 53 as those e-mail addresses may change with changes in employment or the like.

While human chains are used for some peer-to-peer type file sharing systems, these systems are intended to preserve anonymity among users, contrary to the very purpose of an e-mail system which provides reasonably secure and private communication between specified individuals.

The present invention has been described in terms of the preferred embodiment, and it is recognized that equivalents, alternatives, and modifications, aside from those expressly stated, are possible and within the scope of the appending claims.

I claim:

1. A spam resistant e-mail system comprising:
    at least one e-mail managing computer connected to the Internet to communicate with users on user computers via an authenticated communication protocol in which a communication protocol authenticates the identity of an individual user as a sender without relying on an SMTP e-mail header designating the individual user as a sender, the e-mail managing computer and user computers executing stored programs to:
    establish authenticated communications between a given user and the e-mail managing computer using the authenticated communication protocol to establish the identity of the given user;
    allow the given user to form an initial trusted human chain listing other member users who have established communications with the e-mail managing computer using the authenticated communication protocol to establish the identity of the member users;
    produce an augmented trusted human chain for the given user by recursively adding other users linked to member users by trusted human chains of the member users;
    communicate e-mail messages using the authenticated communication protocol between the given user and one or more specified users only if the one or more specified users are in the given user's augmented trusted human chain and are member users wherein the e-mail managing computer and user computers further execute the stored programs to record for users in the augmented trusted human chain:

a tree of the user based trusted human chains linking the users to the given user and a distance along this tree between any two users; and wherein this data is usable by the given user to manage the given user's augmented trusted human chain.

2. The spam resistant e-mail system of claim 1 wherein each user in the augmented trusted human chain of a given user is identified by the given user by an e-mail address of a SMTP e-mail system.

3. The spam resistant e-mail system of claim 1 wherein the e-mail managing computer and user computers further execute the stored programs to:

communicate invitation messages using unauthenticated e-mail communications between the given users and potential users who have not established authenticated communications with the e-mail managing computer, the invitation message allowing the potential users to establish authenticated communications with the e-mail managing computer to become member users and to be added to the given user's augmented trusted human chain.

4. The spam resistant e-mail system of claim 1 wherein the e-mail managing computer and user computers further execute the stored programs to:

allow the given user to delete users from the augmented trusted human chain.

5. The spam resistant e-mail system of claim 4 wherein the given user identifies a user to be deleted by selecting a message communicated by the user using the spam resistant e-mail system.

6. The spam resistant e-mail system of claim 1 wherein the e-mail managing computer and user computers further execute the stored programs to record for users in the augmented trusted human chain a join date of the user and a last date of communication by the user using the spam resistant e-mail system; and wherein this data is usable by the given user to manage the given user's augmented trusted human chain.

7. The spam resistant e-mail system of claim 1 wherein the e-mail managing computer and user computers further execute the stored programs to record for users in the augmented trusted human chain:

data defining a hierarchy of each user within the trusted human chain and data indicating any deletion of the user by one or more other users; and wherein this data is usable by the given user to manage the given user's augmented trusted human chain.

8. The spam resistant e-mail system of claim 1 wherein the authenticated communications between the users and the e-mail managing computer uses an instant messaging protocol.

9. The spam resistant e-mail system of claim 8 wherein the instant messaging protocol is XMPP.

10. The spam resistant e-mail system of claim 1 wherein the e-mail managing computer further establishes an attachment storage file for each of the users; and wherein the communication of e-mail messages between an originating user and one or more receiving users in the given user's augmented trusted human chain may provide a link to an attachment to the e-mail message invocable by the receiving users to transfer attachment data from a storage file for the originating user to a storage file from the receiving users; and wherein the transfer is not performed until invocation of the link by the receiving user.

11. A method of providing a spam resistant e-mail system using at least one e-mail managing computer connected to the Internet to communicate with users on user computers via an authenticated communication protocol in which a communication protocol authenticates the identity of a each individual user as a sender beyond analysis of an SMTP e-mail header that designates the individual user as a sender, the method comprising the steps of:

establishing authenticated communications between a given user and the e-mail managing computer using an authenticated communication protocol to establish the identity of the given user;

allowing the given user to form an initial trusted human chain listing other member users who have established communications with the e-mail managing computer using the authenticated communication protocol to establish the identity of the member users;

producing an augmented trusted human chain for the given user by recursively adding other users linked to member users by trusted human chains of the member users;

communicating e-mail messages using the authenticated communication protocol between the given user and one or more specified users only if the one or more specified users are in the given user's augmented trusted human chain and are member users wherein the e-mail managing computer and user computers further operate to record for users in the augmented trusted human chain: a tree of the user based trusted human chains linking the users to the given user and a distance along this tree between any two users; and wherein this data is usable by the given user to manage the given user's augmented trusted human chain.

12. The method of claim 11 wherein each user in the augmented trusted human chain of a given user is identified to the given user by an e-mail address of a SMTP e-mail system.

13. The method of claim 11 further including the step of:

communicating invitation messages using unauthenticated e-mail communications between the given users and potential users who have not established authenticated communications with the e-mail managing computer, the invitation message allowing the potential users to establish authenticated communications with the e-mail managing computer to become users and to be added to the given user's augmented trusted human chain.

14. The method of claim 11 further including the step of allowing the given user to delete users from the augmented trusted human chain.

15. The method of claim 14 wherein the given user identifies a user to be deleted by selecting a message communicated by the user using the spam resistant e-mail system.

16. The method of claim 11 wherein the e-mail managing computer and user computers further operate to record for users in the augmented trusted human chain a join date of the user; last date of communication by the user using the spam resistant e-mail system; and wherein this data is usable by the given user to manage the given user's augmented trusted human chain.

17. The method of claim 11 wherein the e-mail managing computer and user computers further operate to record for users in the augmented trusted human chain: a hierarchy of the users based trusted human chains linking the users to the given user, and statistics of deletion of the users by one or more other users; and wherein this data is usable by the given user to manage the given user's augmented trusted human chain.

18. The method of claim 11 wherein the authenticated communications between the users and the e-mail managing computer uses an instant messaging protocol.

19. The method of claim 18 wherein the instant messaging protocol is XMPP.

20. The method of claim 11 wherein the e-mail managing computer further establishes an attachment storage file for each of the users; and wherein the communication of e-mail messages between an originating user and one or more receiving users in the given user's augmented trusted human chain may provide a link to an attachment to the e-mail message invocable by the receiving users to transfer attachment data from a storage file for the originating user to a storage file from the receiving users; and wherein the transfer is not performed until invocation of the link by the receiving user.

21. The spam resistant e-mail system of claim 1 wherein the authenticated communication protocol authenticates the identity of a user as a sender by exchanging a password with each user.

22. The method of claim 10 wherein the authenticated communication protocol authenticates the identity of a user as a sender by exchanging a password with each user to that user.

* * * * *